United States Patent
Bruni et al.

(10) Patent No.: US 11,538,351 B1
(45) Date of Patent: Dec. 27, 2022

(54) HUMAN-MACHINE SYSTEMS WITH INTERACTION BASED COGNITIVE ASSESSMENT INPUT SYSTEMS

(71) Applicant: Aptima, Inc., Woburn, MA (US)

(72) Inventors: Sylvain Bruni, Medford, MA (US); Lisa Lucia, West Roxbury, MA (US)

(73) Assignee: Aptima, Inc., Woburn, MA (US)

( * ) Notice: Subject to any disclaimer, the term of this patent is extended or adjusted under 35 U.S.C. 154(b) by 594 days.

(21) Appl. No.: 16/247,252

(22) Filed: Jan. 14, 2019

Related U.S. Application Data

(60) Provisional application No. 62/617,028, filed on Jan. 12, 2018.

(51) Int. Cl.
   *G09B 7/00* (2006.01)

(52) U.S. Cl.
   CPC ..................... *G09B 7/00* (2013.01)

(58) Field of Classification Search
   CPC ........ A61B 5/16; A61B 5/4884; G16H 20/30; G16H 20/70; G16H 50/20; G09B 7/00
   See application file for complete search history.

(56) References Cited

U.S. PATENT DOCUMENTS

| 2011/0207099 | A1* | 8/2011 | Chen | A61B 5/4803 434/236 |
|---|---|---|---|---|
| 2015/0073790 | A1 | 3/2015 | Steuble et al. | |
| 2017/0086729 | A1* | 3/2017 | Bruno | A61B 5/16 |

OTHER PUBLICATIONS

Bixler et al., Detecting Boredom and Engagement During Writing with Keystroke Analysis, Task Appraisals, and Stable Traits. Proceedings of the 2013 international conference on Intelligent user interfaces. pp. 225-234, California, USA, 9 pgs.

Epp et al., Identifying emotional states using keystroke dynamics. Proceedings of the SIGCHI Conference on Human Factors in Computing Systems pp. 715-724, 2011, Vancouver, BC, Canada, 10 pgs.

Durkee et al., Using Context to Optimize a Functional State Estimation Engine in Unmanned Aircraft System Operations. Foundations of Augmented Cognition: 9th International Conference, AC 2015, Held as Part of HCI International 2015, Los Angeles, CA, USA, Aug. 2-7, 2015, Proceedings (pp. 24-35), 12 pgs.

(Continued)

*Primary Examiner* — Nathan Hillery
(74) *Attorney, Agent, or Firm* — John J. Brooks, III

(57) ABSTRACT

A processor based input system is provided for automatically determining the cognitive assessment of a human as an input source to a processor based automated system configured for use in a human-machine team. In some embodiments, the processor based input system comprises an input device, a cognitive assessment input system (CAIS) and a processor based automated system. In some embodiments the CAIS comprises an interaction data acquisition module configured to receive input data from the input device as interaction data, a cognitive indicators and work patterns analysis module configured to determine a cognitive measure from the interaction data, an intervention building module configured to determine automation directives for a processor based automated system from the cognitive measure and the automated system is configured to receive and execute automation directives from the CAIS as an input source to the processor based automated system.

16 Claims, 8 Drawing Sheets

(56) References Cited

OTHER PUBLICATIONS

Karunaratne et al., Surveillance of human-computer interactions: A way forward to detection of users' Psychological Distress. 2011 IEEE Colloquium on Humanities, Science and Engineering, CHUSER 2011, Penang, Malaysia, 7 pgs.

Koldijk et al., The SWELL Knowledge Work Dataset for Stress and User Modeling Research. Proceedings of the International Conference on Multimodal Interaction, 2014, Istanbul, Turkey, 8 pgs.

Langley, John, Occupational Burnout and Retention of Air Force Distributed Common Ground System (DCGS) Intelligence Personnel. Santa Monica, CA: RAND Corporation, 2012., 113 pgs.

Rodrigues et al., Keystrokes and Clicks: Measuring Stress on E-learning Students. Management Intelligent Systems: Second International Symposium (pp. 119-126), 2013, Salamanca, Spain.

Aptima, Inc., Redacted portions of Technical Proposal P-9998-933, titled "PMATT-TA", as submitted to the United States Office of Naval Research, USA, on Apr. 5, 2012, not published, 7 pgs.

Aptima, Inc., Advertising literature for PM Engine, as distributed at the Orlando I/ITSEC Conference, Dec. 2, 2013, Aptima, Inc., Orlando, FL, 1 pg.

Aptima, Inc., Advertising literature for PM Engine, as distributed at the Orlando I/ITSEC Conference, Dec. 1, 2014, Aptima, Inc , Orlando, FL, 1 pg.

Aptima, Inc., Advertising literature for PM Engine, as distributed at the Orlando I/ITSEC Conference, Nov. 30, 2015, Aptima, Inc , Orlando, FL, 1 pg.

Qiu, Jing et al., Body Posture as an Indicator of Workload in Mental Work, Abstract of Article, Human Factors The Journal of the Human factors and Ergonomics Society, 54(D4):636-35, Jul. 2012, 1 pg.

Advanced Simulation Technologyh Inc., Construct User Guide, as downloaded from the Internet on Jan. 7, 2016 from site "http://www.support.asti-usa.com". 11 pgs.

Stacy, Webb; Ayers, Jeanine; Freeman, Jared; Haimson, Craig, "Representing Human Performance with Human Performance Measurement Language", Proceedings of the Interservice/Industry Training, Simulation and Education Conference (2006), Arlington, VA, 11 pgs.

\* cited by examiner

HUMAN-MACHINE SYSTEMS WITH INTERACTION BASED COGNITIVE ASSESSMENT INPUT SYSTEMS

CROSS-REFERENCE TO RELATED APPLICATIONS

This application claims benefit of U.S. Provisional Patent Application No. 62/617,028 entitled "HUMAN-MACHINE SYSTEMS WITH INTERACTION BASED COGNITIVE ASSESSMENT INPUT SYSTEMS" and filed on Jan. 12, 2018; the entire contents of which are incorporated herein by reference.

STATEMENT REGARDING FEDERALLY SPONSORED RESEARCH OR DEVELOPMENT

This invention was made with Government support under FA8750-15-C-0140 awarded by the Defense Advanced Research Project Agency and N00014-14-C-0300 awarded by the Office of Naval Research, U.S. Navy. The Government has certain rights in the invention.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

This invention relates to input systems for human-machine systems, in particular input systems for human-machine teams that automatically determine a cognitive assessment of the human based on the human interactions with the machine.

2. Description of the Prior Art

In the emerging field of human-machine interaction, machine reasoning performs sub-optimally when it does not include information or models of the human(s) involved, whether as operators of the machines or as resources in an operations research problem. Machines that ignore the state of the human(s) in the system may produce sub-optimal plans or resource allocations because they miss an understanding of the current and likely future human states and statuses that may affect plan feasibility, quality, and value. Similarly, machines, such as planning tools or decision-support systems, that ignore the intent, predispositions, and behavior of their human user(s), may generate information products that are not transparent, confusing, or unexpected. In both cases, the machines' lack of consideration for human attributes is bound to producing generally sub-optimal outcomes, which may be altogether counter-productive for the human-machine team. This is a particularly significant technical problem as machines that interact with humans and human-machine teams become a more common technical solution to everyday problems.

Solutions that have been used to address this problem include the employment of human-centered design approaches to the engineering of the machines in the systems, or the characterization of user state with psychophysiological data. However, these solutions have significant shortcomings such as being very intrusive and complex to implement.

Therefore, there is a significant need for methods and approaches that leverage human operator data in a straightforward, resilient, and non-intrusive manner, with the purpose of optimizing human-machine team performance.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

The disclosed human-machine systems generally comprise a human operator, a processor based automated system used with the human operator to perform a function and a cognitive assessment input system (CAIS). The human operator and the automated system, as a team, perform the function. In the team, some tasks may be done by the operator and some may be done by the automated system. The proper balancing of those tasks, given the capabilities of the team members, is what makes the team more efficient. And, the proper balancing of those tasks dynamically, while performing the function, is one of the significant improvements provided by the disclosed systems and methods.

In some embodiments of the invention, the disclosed human-machine systems, and the CAIS address the technical problem of how to unobtrusively and quickly recognize a quantifiable cognitive assessment of the cognitive state of the human in the human-machine team so that the automated system can properly accommodate the state of the human. The technical problem is encountered when trying to optimize the performance of human-machine teams.

Example situations where this technical problem is present is in complex, distributed information gathering and analysis systems that include both humans and processor based machines as part of the system. One such system is the Department of Defense's Distributed Common Ground System (DCGS) which is an intelligence, surveillance, and reconnaissance (ISR) planning and direction, collection, processing and exploitation, analysis, and dissemination (PCPAD) weapon system. The weapon system employs a global communications architecture that connects multiple intelligence platforms, devices and sensors to collect and process vast amounts of intelligence and imagery from manned and unmanned reconnaissance sources. Personnel assigned to the DCGS produce actionable intelligence reports from data collected by these reconnaissance sources. If conclusions made in these reports (as a result of integrated intelligence from varied sources) are inaccurate, such as due to a user being cognitively overloaded and missing (or misinterpreting) a pertinent fact, the decisions and actions that follow from this information may be inappropriate. This problem is compounded if the human-machine system consolidates data from a large number of distributed sites and there is no awareness of the cognitive load of the personnel creating the report.

Conventional solutions to address this problem still have significant shortcomings. Some solutions include the employment of human-centered design approaches to the engineering of the machines in the systems, or the characterization of user state with psychophysiological data. One issue with this approach is that the optimizing behavior (a) requires a priori system-based knowledge of the human (in terms of their skills, etc.), (b) is limited to only those scenarios that are expected to occur, and (c) does not adjust based on the human's current cognitive state. One solution to this problem is to improve the design of the human-machine system through the employment of human-centered engineering methods and the application of human factors principles. By considering a priori knowledge about the humans in the system (such as skills, competencies, training, tasking), designers of human-machine teams optimize the expected behavior of the system against known or expected scenarios. Another solution involves detecting human operator state through psychophysiological data. For example, head-worn sensors that detect brainwaves and infrared cameras that detect pupillary activity may be employed to create a data stream used to assess in quasi real-time a human operator's state. Indeed, research has successfully demonstrated correlation between such psychophysiological activities and validated measures of cognitive workload, fatigue, or attention. In turn, the product of these data analyses are fed back into the automated system to optimize its behavior in support of the human operator. The main issues with this approach lie (a) in the significant intrusiveness and instrumentation required to enable such capability (so much so that many users do not want to explore this option), (b) in the time delays (from the need for multiple data points to reason), complexity, and brittleness of the signals captures (hence requiring expensive engineering of sensor apparatus and analysis models to compensate), (c) in the on-going perceived invasion of privacy caused by physiological sensors, and (d) in the intrinsic need for deep interpretation of what the data means in terms of impact on work products (i.e., plans).

The disclosed systems and methods overcome many of the shortcomings noted above. The disclosed system and methods address the technical problem by automatically monitoring the interaction data from the human to the machine to unobtrusively, and in real-time, determine the cognitive state of the human and determine appropriate interventions to accommodate the state of the human. By accurately and quantitatively measuring the cognitive state of the human, the human-machine team is able to deliver enhanced task performance (e.g., faster completion, better quality, improved accuracy, or prolonged endurance) while, at the same time, maintaining or enhancing human's cognitive state (e.g., quantitatively optimal workload, lower fatigue, better focus and attention).

The disclosed systems and methods have many practical applications. One particular application comprises a human-machine team where the CAIS enabled systems may monitor the state of the human(s) to produce more efficient plans or resource allocations because they account for the current and likely future human states and statuses that may affect plan feasibility, quality, and value. Similarly, machines, such as planning tools or decision-support systems, that are able to assess the cognitive state (e.g., intentions, predispositions, and behaviors) of their human user(s), may generate better information products and results. Human-machine teams that heavily rely on users for repetitive and detailed task, over long periods of time may particularly benefit from the disclosed systems. Specific human-machine applications may include human-machine systems that perform tasks such as but not limited to complex task planning/monitoring, surveillance, search and rescue, network/facility monitoring and maintenance, disaster relief. The systems and methods may also be applied to semi-automated systems such as aircrafts using auto-pilot, semi-autonomous vehicles and semi-automated manufacturing and storage facilities.

In one example embodiment, a processor based automated system for use in a human-machine team is disclosed, the processor based automated system comprising an input sensor and a cognitive assessment input system (CAIS) wherein the processor based automated system is specifically configured for use in a human-machine team and the automated system is configured to receive and execute automation directives from the CAIS as an input source to the processor based automated system.

In one example embodiment, a processor based input system for automatically determining a cognitive assessment of the cognitive state of a human as an input source to a processor based automated system configured for use in a human-machine team is disclosed, the processor based input system comprising an input device, a cognitive assessment input system (CAIS) and the automated system is configured to receive and execute automation directives from the CAIS as an input source to the processor based automated system.

In some embodiments, the CAIS comprises an interaction data acquisition module configured to receive input data from the input device as interaction data, a cognitive indicators and work patterns analysis module configured to determine a cognitive measure from the interaction data, and an intervention building module configured to determine automation directives for a processor based automated system from the cognitive measure.

In some embodiments, the system further comprises a strategic performance assessment module configured to determine a performance assessment and the intervention building module configured to determine the automation directive based on at least one of the cognitive measure and the performance measure. In some embodiments, if the performance assessment fails to meet a pre-defined threshold, the automation directive from the CAIS is an instruction for the processor based automated system to perform a task.

In one example embodiment, methods to optimize human-machine teams using device interactions as a "sensor" is disclosed comprising the steps of (1) acquiring human-machine interaction data, (2) generating cognitive indicators and work pattern analyses products to produce a cognitive assessment of a cognitive state, and (3) producing outputs directly useful to other machines. In one example embodiment, the inputs to this process may be a combination of interface monitoring signals, physical sensor data, and/or communications data. In one example embodiment of the invention, the outputs of this process may be automation directives.

The disclosed solution is not an obvious solution because it combines a human factors solution (analysis of patterns of human-system interactions) with an operational research solution (countering sub-optimal planning strategies) that had not been previously attempted in general, and specifically in the domain of planning and replanning optimization. Human-system interaction data analysis has been limited to concerns of usability of interface design, more specifically with the discoverability of features or data within graphical user interfaces.

Other objects, features, and advantages of the techniques disclosed in this specification will become more apparent from the following detailed description of embodiments in conjunction with the accompanying drawings.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5A shows a functional diagram of one embodiment of the interaction building module;

FIG. 5B shows an example mapping of a measure of intrusiveness and a measure of magnitude for an actionable message, based on the delta value and the priority of the task the user should be working on;

DETAILED DESCRIPTION OF THE INVENTION

Figure 1:
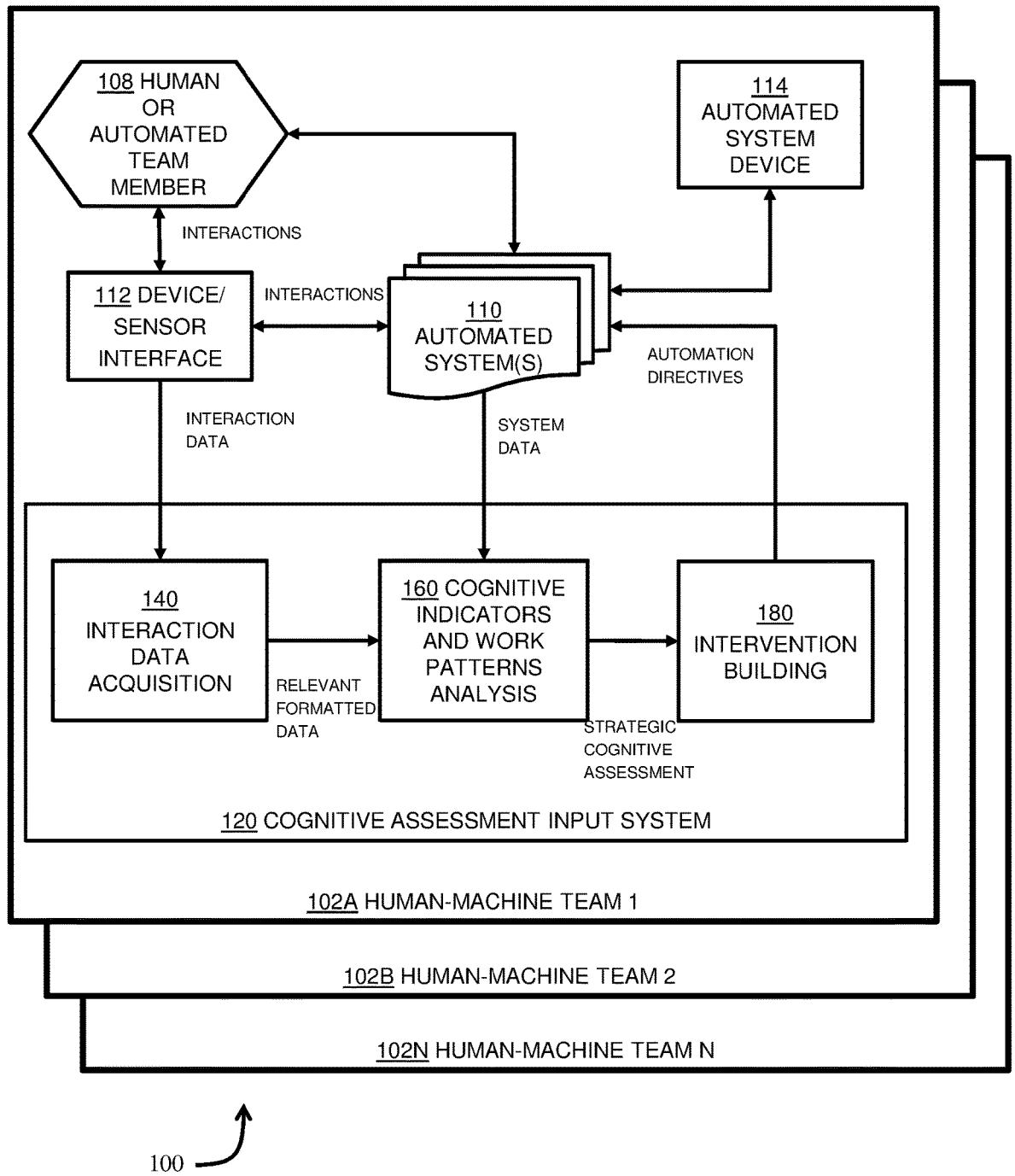
FIG. 1 illustrates an example embodiment of a human-machine team utilizing a cognitive assessment input system (CAIS)

COPYRIGHT NOTICE: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright © 2019, Aptima, Inc., All Rights Reserved.

Human-machine systems with interaction based cognitive assessment input systems and methods of use will now be described in detail with reference to the accompanying drawings. It will be appreciated that, while the following description focuses on example systems that perform distributed intelligence analysis, the systems and methods disclosed herein have wide applicability. For example, the human-machine systems and subsystems described herein may be readily employed with other human-machine teams such as those found in a large distribution organization, a data network service provider, a power grid operator, a nuclear power facility or other partially automated systems. Notwithstanding the specific example embodiments set forth below, all such variations and modifications that would be envisioned by one of ordinary skill in the art are intended to fall within the scope of this disclosure.

As used herein, the term "module" refers to hardware and/or software implementing entities, and does not include a human being. The operations performed by the "module" are operations performed by the respective hardware and/or software implementations, e.g. operations that transform data representative of real things from one state to another state, and these operations do not include mental operations performed by a human being.

The terms "sensor data", as used herein is a broad term and is to be given its ordinary and customary meaning to a person of ordinary skill in the art (and are not to be limited to a special or customized meaning), and furthermore refers without limitation to any data associated with a device or sensor, such as audio, video, location, body motion, movement or displacement, digital communication (e.g., chat messages, emails, VOIP), computer interactions (e.g., mouse and keyboard dynamics, computer program or browser activities), or physiological data (e.g., brain waves, pupillary behavior, galvanic skin response, heart rate or pulse).

The disclosed systems and methods address the technical problem of how to accommodate the dynamic state of the human operator in a human-machine team. The disclosed systems and methods address this problem by automatically monitoring the interaction data from the human to the machine to unobtrusively, and in real-time, determine the state of the human and determine appropriate interventions to accommodate the state of the human. In some embodiments, an assessment of the cognitive state of the human operator is determined and considered in the interventions provided by the system.

Example situations where the technical problem is particularly present is in complex, distributed information gathering and analysis systems. One such system is the Department of Defense's Distributed Common Ground System (DCGS). The DCGS is an intelligence, surveillance, and reconnaissance (ISR) planning and direction, collection, processing and exploitation, analysis, and dissemination (PCPAD) weapon system. The weapon system employs a global communications architecture that connects multiple intelligence platforms and sensors. The DCGS mission is to collect and process vast amounts of intelligence and imagery from manned and unmanned reconnaissance sources. Personnel assigned to the DCGS produce actionable intelligence reports from data collected by a variety of sensors on ISR platforms such as the U-2, RQ-4 Global Hawk, MQ-1 Predator and the MQ-9 Reaper.

The DCGS is a globally distributed and networked set of sites. For example, the Air Force DCGS is currently composed of 27 regionally aligned, globally networked sites. The individual weapon system nodes are regionally aligned and paired with corresponding Air Force components to provide critical processing, analysis, and dissemination of intelligence collected within the numbered air force's area of responsibility; however, globally networked capabilities enable other DCGS sites to execute missions beyond their numbered Air Force's geographic area of responsibility. The Air Force DCGS participates in operations throughout the world with the daily operational tempo of the Air Force DCGS being about more than 50 ISR sorties exploited, over 1,200 hours of motion imagery reviewed, approximately 3,000 Signals Intelligence (SIGINT) reports produced, 1,250 still images exploited, and 20 terabytes of data managed daily. The operational crew size per 12-hour mission is: for high altitude U-2 or RQ-4 multi-INT=45 personnel; for medium altitude MQ-1/9 multi-INT=8 personnel.

However, DCGS is rendered useless without the thousands of intelligence personnel who work within the DCGS around the clock to analyze the incoming data and synthesize it as part of the larger global intelligence picture. This could mean assisting missions in real time, archiving data to be evaluated later or to build a history of a target, or accessing and dispensing that archived information as needed. Generally speaking, analysts at DCGS are responsible for: processing the data as it comes in, exploiting whatever useful information is contained therein, and disseminating those intelligence products back to whoever needs the information—a soldier or marine on the ground, or an armed aircraft preparing a strike, for example.

Specifically, with the DCGS as an example, the technical problem resulting from large human-machine teams is how to account for the human within the team. Reports such as the "Occupational Burnout and Retention of Air Force Distributed Common Ground System (DCGS) Intelligence Personnel" by John K. Langley, published by the RAND Corporation in 2012, which is incorporated by reference in its entirety, detail how the effectiveness of the DCGS can be impacted by the state of the user.

Therefore, with the technical challenge of efficiently operating this key intelligence gathering system, the technical problem arises in how to account for critical contribution of the user as a key component of the distributed system? The technical solution is to recognize the user as a key component in those human-machine systems and autonomously measure the state of that user so that their contribution or any lack thereof is recognized and accounted for by the rest of the system and the team. The resulting technical solution enables the system to respond to the different cognitive states of the user with responses that improve the performance of the human-machine team. For example, and not for limitation, this includes responses such as tailoring the prioritization of tasks for the user, queueing, presenting or prioritizing different information to the user, presenting the same information to the user but in a different format, issuing alerts, alarms or warnings to the user or to other entities in the system, pre-computing potential courses-of-actions that may be subsequently relevant to the user, or offloading some tasks through automation by the machine or through handoff to other team members (human or not).

Also, by quantifying the cognitive state of the user, the human-machine team may more easily accommodate other features of a human-machine system. For example, in some embodiments of human-machine systems, data (other than and including interaction data) can be monitored, and modeled according to workflow task patterns, and analyzed to determine the task(s) being performed or to predict the task(s) that will be or should be performed by the team. This task data may be able to have baseline, expected, and/or threshold cognitive states associated with them so that the actual, real-time cognitive states of the user can be compared to those baselines/expectations/thresholds to determine whether certain responses are recommended. For example, humans who have more experience or expertise performing a given task will tend to be quantified as having a low level of "task overload" (an example of cognitive state) when performing that task; novices, on the other hand, as they are less comfortable and familiar with the task, may exhibit a measurable increase in their "task overload" levels compared to the baseline level of experts. In the case where the machine is made aware of the novice's high "task overload" levels, the system can respond by providing simple prompts to direct the novice through the task. This response will be made particularly possible when the actions that contribute to a given task are modeled and deemed to be consistent across users. Quantifying the task data and cognitive states may also allow future tasks and cognitive states to be predicted so that the human-machine system can proactively respond to those predicted conditions.

Given these types of vast and distributed human-machine teams, the disclosed technical solution is significantly more than implementing an abstract idea on a generic computer. For example, embodiments of the disclosed systems and methods include a specific hardware based system incorporating processor based automated systems specifically configured to operate with a human operator in a human-machine team and with teams of human-machine teams. The disclosed automated systems, as part of a human-machine team, supplemented with the CAIS, improve the functioning of the automated systems in that it may help select interventions that assist the human-machine team.

Furthermore, the system components, when used in combination, perform functions that are not merely generic computer functions. In particular, these systems are performing functions to specifically recognize the cognitive state of the user and that cognitive state of the user can be critical in the accuracy of their analysis and inputting of large amounts of data for use by the human-machine team.

Furthermore, the solution is directed to a specific improvement in the functionality of computers that are processing large amounts of data that also have some human operator interpretation or input. In particular, the solution improves the human computer interface for a human-machine team to unobtrusively detect the cognitive state of the user as a key component of the human-machine team.

Furthermore, these automated systems provide interventions to help the human-machine team perform and improve the functioning of the automated systems as part of a human-machine team. For example, and not for limitation, the automated systems may provide assistance to the human such as prompts for additional action or it may provide assistance by performing some of the tasks that lessen the cognitive load of the human.

Furthermore, these human-machine teams implement unconventional steps that confine the claim to a particular useful application. It is not well-understood, routine or conventional to determine the state of a user in a human-machine team and then have the system use that state.

One Embodiment of the Human-Machine System with a Cognitive Assessment Input System (CAIS):

For illustration purposes and not for limitation, one embodiment of the present invention is shown in FIG. 1. As shown, the human-machine system 100 generally comprises a human operator 108, a processor based automated system 110 used with the human operator to perform a function, and a cognitive assessment input system (CAIS) 120.

In some embodiments, the automated system 110 may perform part of the function of the human-machine team 100, or part of the function of a team of human-machine teams. For example, in a military intelligence system like the DCGS, the automated system 110 may include interfaces that communicate graphic or textual data to the human operator 108 for the human operator 108 to act on or interpret. In some embodiments, the automated system 110 may include or may interface with an automated system device 114 to help perform the function. For example, and not for limitation, the automated system device 114 may be a mechanical device such as a gripping arm on a robot on a manufacturing plant floor or the device may be a computer configured to communicate instructions across a distributed communications network.

Typical human-machine systems without the disclosed CAIS, even those trying to address the technical problems associated with not properly accounting for the state of the human in the human-machine team, have major technical shortcomings. For example, solutions that incorporate a priori knowledge about the humans in the system (such as skills, competencies, training, tasking) have major technical shortcomings. Designers of human-machine teams optimize the expected behavior of the system against known or expected scenarios but typically do not account for emerging situations where human-machine teams are expected to produce high performance under dynamic or unknown situations, or when the data supporting the human-machine teams is uncertain or incomplete. For example, in military mission planning or replanning, unexpected scenarios develop, where the inherent limitations of a priori system design become a burden: under very high workload or fatigue conditions, human operators may start experiencing a tunnel effect whereby they miss or ignore critical pieces of information, prune out valid plans by mistake, or revert to standard and under-performing behaviors as a coping mechanism against high workload and fatigue. Similarly, the human-machine team may encounter an off-nominal condition for which the baseline system design yields inherently sub-optimal performance (because it was not conceived for this situation).

Shortcomings are also found in solutions that detect human operator state through psychophysiological data introduce several problems. For example, some of these solutions utilize head-worn sensors that detect brainwaves and infrared cameras that detect pupillary activity, which may be employed to create a data stream used to assess in quasi real-time a human operator's state. Indeed, research has successfully demonstrated correlation between such psychophysiological activities and validated measures of cognitive workload, fatigue, or attention. In turn, the product of these data analyses are fed back into the automated system to optimize its behavior in support of the human operator. The main issues with this approach lie (a) in the significant intrusiveness and instrumentation required to enable such capability (so much so that many military agencies do not want to explore this option), (b) in the time delays (from the need for multiple data points to reason), complexity, and brittleness of the signals captures (hence requiring expensive engineering of sensor apparatus and analysis models to compensate), (c) in the on-going perceived invasion of privacy caused by physiological sensors, and (d) in the intrinsic need for deep interpretation of what the data means in terms of impact on work products (i.e., plans).

To address these technical problems, as shown in FIG. 1, the human-machine system 100 disclosed herein may be enhanced to interact with a cognitive assessment input system (CAIS) 120. The CAIS 120 addresses this technical problem by providing the technical solution that uses the human interactions (with the device/sensor interface 112) as a "sensor" to recognize and quantify a cognitive assessment of the human for use as input to the machine of the human-machine system 100. Generally, the cognitive assessment input system 120 (1) acquires human-machine interaction data, (2) generates cognitive indicators and work pattern analyses products to produce a cognitive assessment, and (3) produces outputs directly useful to other machines. In one embodiment of the invention, the inputs to this system may be a combination of interface monitoring signals, physical sensor data, and/or communications data.

This technical solution utilizes potential ways to unobtrusively capture data that can be efficiently translated into a quantitative measure of the cognitive state of the human. Examples of suitable sources of interaction data to determine the cognitive state of the human include those listed below.

Using click rate data as a measure of workload. In past research studying vigilance and surveillance tasking, click rate correlated with subjective reports of workload. More specifically, as click rate increased, self-reported workload increased as well suggesting that higher click rates can be used as indicators of higher perceived workload levels.

Using switch rate data as a measure of workload or attentional focus. When a user is working on many tasks at once, trying to respond to time-sensitive situations, he or she may flip back and forth between many programs, documents, or websites, spending only brief amounts of time on individual content and attempting to hold onto lots of information in working memory—as such, higher switch rates may suggest greater workload or lower levels of attentional focus.

Using dwell time data as a measure of attentional focus. If a user's task involves specific information or work within a select few programs, documents, or websites, the amount of time they spend on these may increase as they emphasize work on this task. In this way, dwell time may indicate attentional focus; increased dwell time may suggest increased levels of focus. Depending on the task and the number of resources required for that task, workload may vary irrespective of dwell time (i.e., these measures may not correlate with one another).

Using time detail data as measures of fatigue. Users tend to become more fatigued with more time-on-tasks and as a function of time-of-day. As such, a measure of fatigue can be calculated from time since shift start or workstation log-in (increases in shift time lead to increases in fatigue) as well as from a time-of-day assessment (note: this would be calculated relative to a user's biological rhythm norms or the time since their last sleep; e.g., 9 am to 5 pm workers tend to be more tired during the nighttime than the daytime).

Over time, and through observational learning studies with self-report or other indicators (e.g., physiological metrics) of workload, fatigue, and attentional focus, the way these interface signals are used in cognitive calculations can be revised to more accurately indicate cognitive levels for specific users or user roles.

Figure 2:
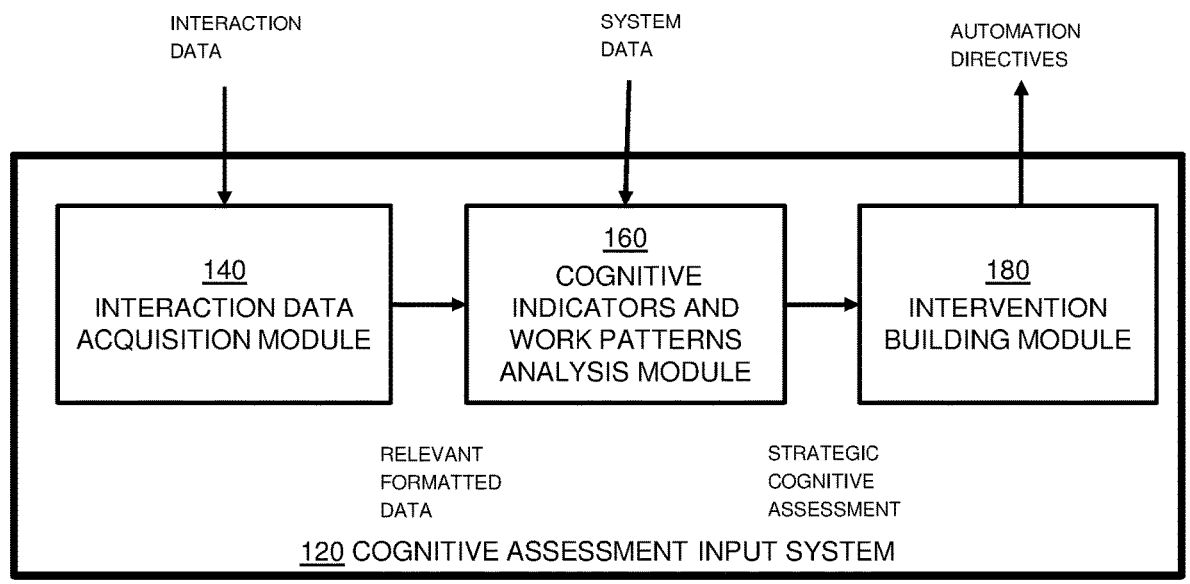
FIG. 2 illustrates a functional diagram view of one embodiment of a CAIS.

Referring to FIGS. 1 and 2, the cognitive assessment input system (CAIS) 120 generally comprises a processor based device specifically programmed to include an interaction data acquisition module 140, a cognitive indicators and work pattern analysis module 160, and an intervention building module 180. The interaction data acquisition module 140 generally acquires interaction data and treats the data (filtering for usefulness and formatting for use). The cognitive indicators and work pattern analysis module 160 generally determines cognitive indicators and work patterns for comparison to rules and thresholds and for identification of reduced performance states wherein a user is more likely to make an error, miss a critical deadline, or fail to respond to an important piece of new information. The intervention building module 180 generally determines and produces interventions for automated system(s) that may be useful to the human-machine team 102.

Figure 3:
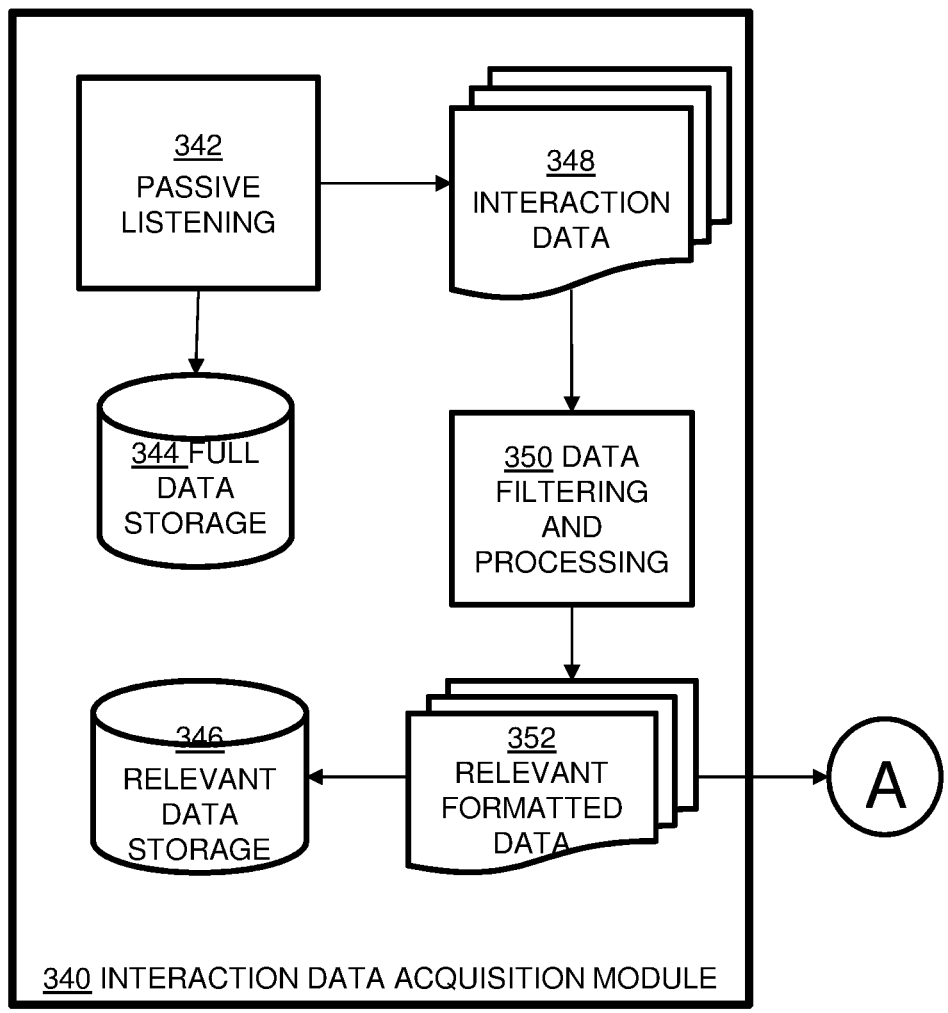
FIG. 3 shows a functional diagram of one embodiment of the interaction data acquisition module.

As shown in FIG. 3, the interaction data acquisition module 340 generally comprises modules for passive listening 342, data filtering and processing 350, storage of module data 346, and modules for communication of relevant formatted data 352 to the cognitive indicators and work patterns analysis module. The interaction data acquisition module 340 generally receives raw interaction data 348 from the human-machine systems and outputs relevant and formatted data 352 for the cognitive indicators and work pattern analysis module.

Within the interaction data acquisition module 340, the passive listening module 342 is in communication with the human through the user's interaction with the device/sensor interface. The device/sensor interface may comprise any type of human sensor or device with an interface that accepts input from or provides for an interaction with the user. For example, and not for limitation, a device or sensor interface may comprise a computer mouse, a computer keyboard, an eye tracking camera, operating system use activity (programs, documents, or websites that are opened/closed, minimized/access, or otherwise interacted with), styluses, touchscreens and touchpads, and pressure-sensitive mechanisms.

As interactions are made with the device/sensor interface, the passive listening module 342 unobtrusively captures interaction data 348 between one or multiple human or automated team member(s) and one or multiple automated system(s). The passive listening module 342 may be any type of tool that monitors and captures and logs interaction data from the device/sensor interface. For example, in some embodiments, the passive listening module may be a data logger tool, an application tracker, a keystroke monitor, a network sniffer or a network monitoring tool. The passive listening module 342 may also receive communications from applications used by the human-machine system, or from extensions of these applications that provide similar interaction data about the user's interaction with the system.

The interaction data 348 communicated by the device/sensor comprises the raw data that is used to detect the task being performed by the user and infer the cognitive state of the user. For example, interaction data may be mouse clicks (left or right buttons), mouse scrolling (up/down), mouse pointer location and movement (location on x/y grid of screen), keyboard input (letters, numbers, special characters, additional keys [e.g., up/down arrows, backspace], and shortcut keys [e.g., ctrl+s] typed), and operating system logs (e.g., Microsoft Office document opened). These data may be organized according to time and date stamps per observed action, along with program type, document/website name or title, action type (e.g., left mouse click, mouse hover-over, key press), and action content (e.g., send button, weekend weather icon, sentence typed). Additionally, formatted data can be used to pick up on periods of inactivity, e.g., user down-time or a user's heavy focus on a particular program open on-screen.

Within the interaction data acquisition module 340, the passive listening module 342 unobtrusively receives interaction data 348 to be communicated to the data filtering and processing module 350 which identifies relevant formatted data 346 for storage and for action by the cognitive indicators and work pattern analysis module.

A full data storage database 344 may archive all data captured by the passive listening component 342.

Within the interaction data acquisition module 340, the data filtering and processing module 350 is configured to perform the task of exploiting the interaction data 348 captured by the passive listening component 342, and outputting a stream of relevant and formatted data 352 to the cognitive indicators and work patterns analysis module. For example, the organized raw data may be filtered down according to thresholds, constraints and characteristics currently relevant to the human-machine systems. This filtering may, for example, include specific time periods (e.g., the last five minutes), specific input mechanisms (e.g., mouse clicks only), input associated with specific tasks (e.g., opening new documents only) or specific users (e.g., DCGS operator 1 only). Additionally, this filtered data may be tagged with the current task (based on the user's checking-off of tasks on a task list), according to user-relevant topics (as determined from an analysis of daily briefing or ongoing mission documents in an accessible directory), or along with self-report ratings of cognitive state levels (e.g., how overwhelmed do you feel right now on a scale of 1 to 10?). These filtered data, processed with additional relevance tags, will comprise the relevant formatted data.

A relevant data storage database 346 may be provided that archives data output by the data filtering and processing component 350.

Figure 4:
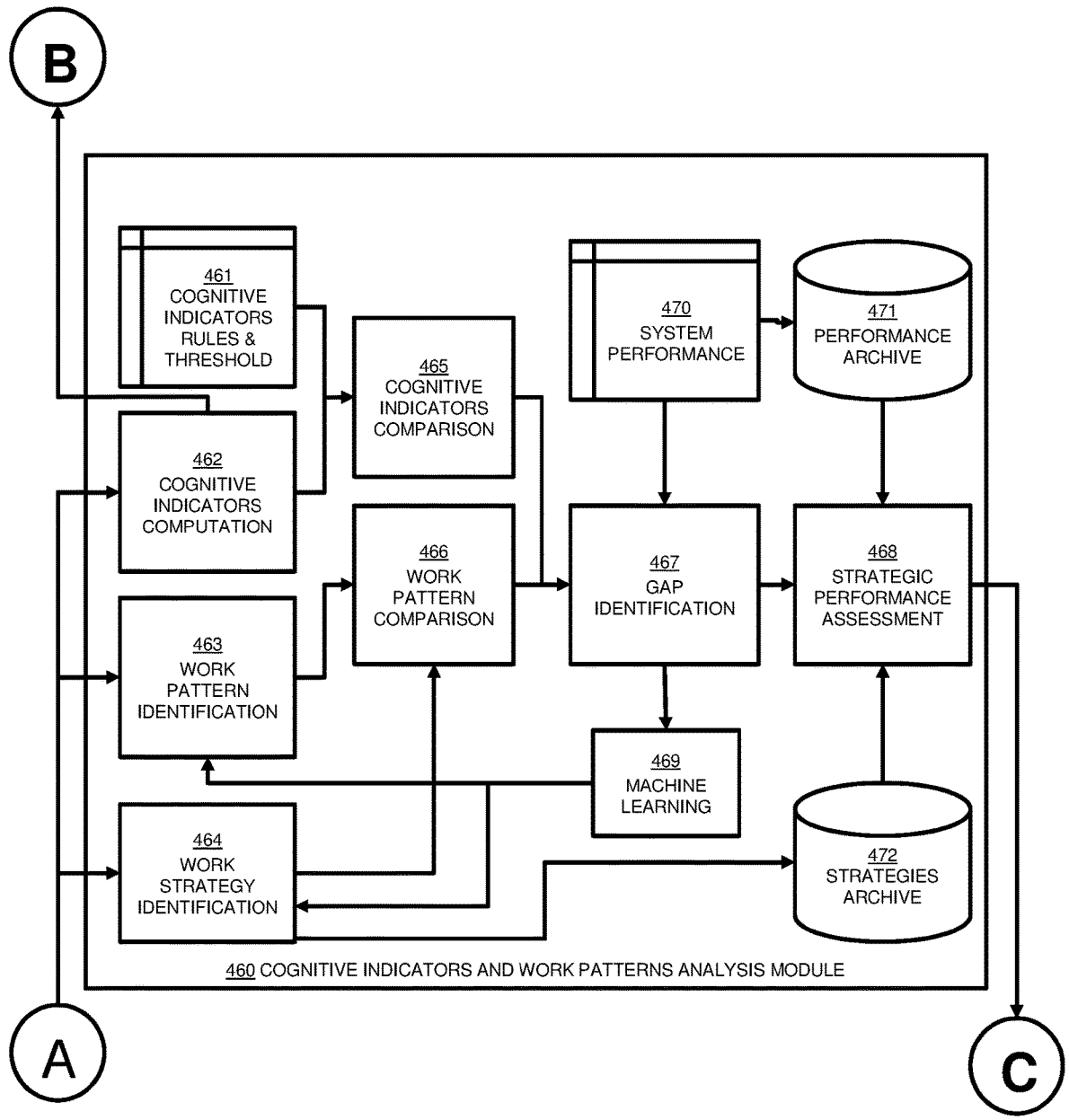
FIG. 4 shows a functional diagram of one embodiment of the cognitive indicators and work patterns analysis module.

FIG. 4 illustrates a functional diagram of an example embodiment of a cognitive indicators and work pattern analysis module 460. The cognitive indicators and work pattern analysis module 460 is configured to determine cognitive indicators and work patterns for comparison to rules and thresholds, for identification of reduced performance states wherein a user is more likely to make an error, miss a critical deadline, or fail to respond to an important piece of new information, and for strategic performance assessments.

The cognitive indicators and work pattern analysis module 460 receives relevant and formatted data from the interaction data acquisition module (shown through connection A from FIG. 3) and produces (1) strategic cognitive assessment and (2) strategic task performance data for the intervention building module.

Within the cognitive indicators and work pattern analysis module 460, the cognitive indicators computation module 462 generally computes cognitive indicators and their values (such as workload, fatigue, attentional focus, etc.) based on relevant, formatted interaction data. These individual cognitive indicators may be used as the strategic cognitive assessment of the human or combinations of indicators may provide the strategic cognitive assessment.

For example only, and not for limitation, workload as a cognitive indicator may be measured by data representing mouse click rate. More specifically, it may be calculated according to this formula: $(33.602+9.021M)/100$, where M=average number of mouse clicks per second within a pre-defined time increment (e.g., 2 minutes). Higher calculated values indicate greater workload.

For example only, and not for limitation, fatigue as a cognitive indicator may be measured by a combination of data representing time-on-task and time-since-sleep. More specifically, it may be calculated according to this formula $(G+H)/2$, where G is the look-up value from the time-on-task in Table 1 below and H is the look-up value from the time-since-sleep table below. Higher calculated values indicate greater fatigue.

TABLE 1

| Time Since Starting (hours) | 0-1 | 1-2 | 2-3 | 3-4 | 4-5 | 5-6 | 6-7 | 7-8 |
|---|---|---|---|---|---|---|---|---|
| Time-on-Task Fatigue | .1 | .2 | .3 | .4 | .5 | .6 | .7 | .8 |

TABLE 2

| Time Since Sleep (wake-up) in hours | 0-3 | 3-6 | 6-9 | 9-12 | 12-15 | 15-18 | 18-21 | 21+ |
|---|---|---|---|---|---|---|---|---|
| Time-of-Day Fatigue | .01 | .2 | .4 | .5 | .6 | .7 | .8 | .9 |

For example only, and not for limitation, attentional focus as a cognitive indicator may be measured by data representing dwell time. More specifically, it may be calculated by the formula: D/E, where D is the average time spent on each individual program, document, or website per a given time increment and E is the maximum observed D value. Higher calculated values indicate increased attentional focus.

The cognitive indicators comparison module 465 generally compares the computed cognitive indicators to data sets representing rules and/or thresholds pre-defined for the human-machine teams. For example, a comparison would be a workload indicator value that has become higher than a reference value therefore yielding the likelihood of cognitive state overload for the user. Another example for a comparison would be a comparison of the current fatigue measure against the operating rules of the system to ensure the current measure is acceptable. Furthermore, multiple cognitive indicators may be considered in conjunction with one another; for example, higher workload thresholds may be utilized when the system determines that the user is in a less fatigued state (and vice versa). Rules and thresholds for the cognitive state assessment of the human can be defined according to user-specific experimental test results or based on known norms from published research (e.g., the Yerkes-Dodson law of arousal vs. performance).

The work pattern identification module 466 generally identifies a work pattern (short-term, actions-based behavior) based on data including relevant, formatted interaction data. The same relevant, formatted interaction data used for cognitive indicators computation module can be used for work pattern identification module. In this module, generally, the order and combination of data representing near-in-time observed interactions contributes to the development of work patterns. For example, a pattern could be identified by data representing the succession of what computer software windows are visible to the user. Another example of a pattern would be identified by the order of click vs. keyboard inputs performed by the user in the system.

The work strategy identification module 464 generally identifies a work strategy (long-term, goals-based behavior) based on data including relevant, formatted interaction data. This component archives identified work strategies as data sets for comparison to data including interaction data. For example, a work strategy would be identified by data representing the user's consistent focus on specific object(s) or data representing task(s) as detected by the user's keyboard inputs and clicks, or the focus of their gaze on the screen. As another example, a work strategy could be identified by having task or profile data representing a user's current tasking (e.g., today, you should focus on xzy), and when the work strategy identification module notices a match between data form the user's activities (e.g., what they're typing) and their current tasking, the module recognizes that the user is working toward a particular goal (e.g., goal-based strategy).

The work pattern comparison module 466 generally compares the identified work pattern with the identified work strategy. For example, a comparison would be between data representing the pattern of clicks by the user over the last minute (work pattern) and data representing the tasks detected over the last ten minutes (work strategy), in order to identify possible discrepancies or task switching or deviation.

The gap identification module 467 generally identifies the current gaps in cognitive indicators and work patterns from the outputs of the two comparison components and current system performance data. Gaps are defined here as deviations from expected or normal values in the cognitive indicators and the work patterns. For example, an identified gap would be data representing high user workload beyond an acceptable threshold (cognitive indicator) concomitant with high frequency task switching (work pattern) and low system performance. This component feeds the work strategies identification module 464 to continuously improve that module's performance: depending on the existence or lack of gap in cognitive indicators and/or work patterns, the gap identification module refines, discounts or reinforces the work strategies in the work strategies identification module. Another example of gap identified in this module may be data representing a detection that the user is adopting a work pattern and/or strategy that has been shown in the past to yield low performance when performed under the current level of user fatigue. Another example of a gap may be the risk to cognitively overload the user if the current work strategy is continued under the current characteristics of system performance.

The gap identified by the gap identification module 467 may also include identifying cognitive indicator or work pattern gaps between those of an experienced user and those of a less experienced user. In the case of a less experienced user, the recognition of a work pattern gap may be very helpful as system directives or interventions could serve to adapt the user interface to guide the novice through work in ways that it would expect a more experienced user to perform.

The strategic performance assessment module 468 generally produces a strategic performance assessment, or a performance measure, from gap identification data, archived performance data, and archived strategies data. This strategic performance assessment module establishes whether an intervention is needed, and, if yes, what the characteristics of that intervention should be based on records of past strategies and past system performance. For example, a strategic performance assessment is that there exists a risk of performance decrement due to poor task prioritization; e.g., the user is spending more than warranted attentional focus on a low priority task that should be resolved by re-orienting the user's attention to the higher priority, time-sensitive task. Another example of strategic performance assessment is the characterization that the user is continuing to perform a task that is obsolete, therefore requiring a prompt to adopt a different work strategy, in order to focus on another specific task.

The strategic performance assessment module 468 communicates a series of parameters to the intervention building module that establish the characteristics of an intervention, if needed. For example, the strategic performance assessment module 468 would communicate parameters such as the percentage of the likelihood of a significant deviation between the current user workload and an idealized user workload, or such as the priority level of the next task on which the user should focus their attention. The parameters would be subsequently used to determine how an intervention would be crafted to address the gaps identified.

For the above modules that perform comparisons of one data set to one or more data sets, typical statistical techniques for data set comparison may be used. For example only, and not for limitation, techniques such as the following may be suitable for execution in the modules: T-Test, Wilcoxon test, Mann-Whitney test, One-way ANOVA test, ANOVA test, Kruskal-Wallis test, Friedman test, Correlation test and Regression analysis.

For the above modules that perform comparison of one data set to others using pattern matching, typical pattern matching techniques may be used. For example only, and not for limitation, pattern matching techniques such as the following may be suitable for execution in the modules: statistical pattern recognition, data clustering, application of fuzzy sets, neural networks, structural pattern recognition, syntactic pattern recognition, approximate reasoning approach and support vector machines (SVM).

Additionally, it is understood that the use of interaction data as input to system modules can be supplemented by other data from other sources. For example, it is understood that additional data such as but not limited to user profile data, task data, mission data, performance data and other contextual data can also be used in the modules to help determine work patterns, work strategies, cognitive indicators and system performance.

As shown, a machine learning module at 469 may be included to take data gained from modules such as the cognitive indicators computation module, the cognitive indicators comparison module, the work pattern identification module, the work pattern comparison module, the work strategy identification module and the gap identification module to be used as input to a machine learning module at 469 to learn and update parameters in any of these modules. Examples of suitable machine learning techniques may include, but are not limited to supervised learning techniques (e.g., classification (support vector machine (SVM), boosted and bagged decision trees, k-nearest neighbor, Naïve Bayes, discriminant analysis, logistic regression, and neural networks) or regression (include linear model, non-linear model, regularization, stepwise regression, boosted and bagged decision trees, neural networks, and adaptive neuro-fuzzy learning)) and unsupervised learning techniques (e.g., clustering (including k-means and k-medoids, hierarchical clustering, Gaussian mixture models, hidden Markov models, self-organizing maps, fuzzy c-means clustering, and subtractive clustering)). Other examples of suitable machine learning techniques may include, but are not limited to Natural Language Processing (NLP), Latent Dirichlet Allocation (LDA), and K-Nearest Neighbors (KNN) techniques.

Examples of updating module parameters with machine learning techniques may include updating task identification parameters in the work pattern identification module by learning associations between series of workstation interactions. Also, workflow identification parameters in the work strategy identification module may be updated by learning associations between tasks. Also, cognitive parameters like attentional focus in the cognitive indicators comparison module may be updated according to learned associations with specific tasks (e.g., task A tends to involve long spans of time on the same document while task B tends to involve collating data from a variety of documents and websites into a summary report).

A particularly helpful parameter to learn is attentional focus. This may be measured by dwell time. More specifically, it may be calculated by the formula: D/E, where D is the average time spent on each individual program, document, or website per a given time increment and E is the maximum observed D value. In this case, the historical maximum dwell time is extremely critical to this formula. One may implement this formula to function at a per user basis to effectively hone in on individual difference factors (e.g., users may complete tasks in different ways while still achieving task goals). In this implementation, historical maximum dwell times will be saved per user. A variation on this implementation may involve a time-dependent maximum dwell time per user instead; in other words, the maximum dwell times observed per user within the past 30 days (or when machine learning recognizes a significant departure from the existing maximum) may serve as a more current and accurate estimate of an individuals' attention span. This time-dependent maximum is expected to be most useful in users who are less experienced; as they become more familiar with the job, their methods for completing tasks may change, and so will their observable attentional focus levels. With these example implementations, higher calculated values will still indicate increased attentional focus, but these measurements will be normalized to accurately describe individual users.

Figures 5A, 5B:
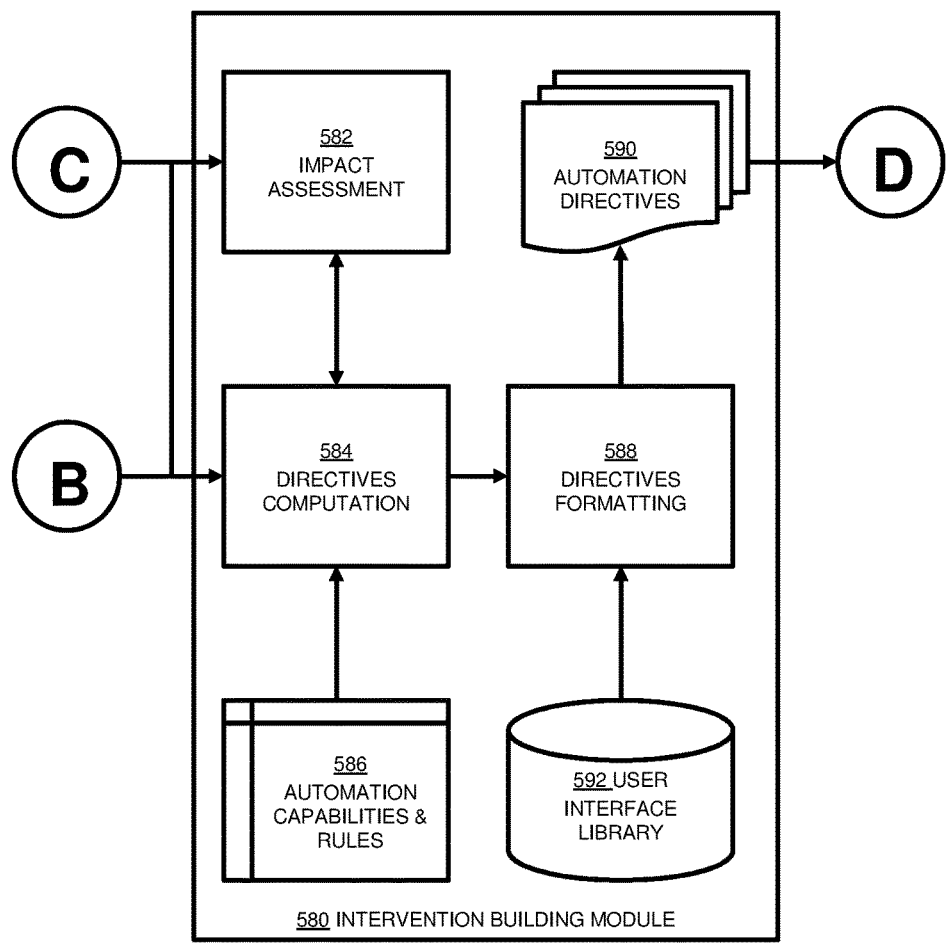

FIG. 5A illustrates a functional diagram of an example embodiment of an intervention building module 580. The intervention building module 580 generally receives strategic cognitive assessments from the cognitive indicators and work pattern analysis module (shown as connection B to FIG. 4) and performance data from the cognitive indicators and work pattern analysis module (shown as connection C to FIG. 4) to determine automation directives that feed back into the automated system(s). The performance data reflects how directives are expected to impact system performance or how those directives may have actually impacted system performance in the past. The intervention building module 580 includes an impact assessment module 582, a directives computation module 584, automation capability and rules 586, a directives formatting module 588, a user interface library 592 and automation directives 590.

The impact assessment module 582 receives draft directives from the directives computation module and, based on records of past system performance (performance data), determines the likely impact of the draft directives on the user's cognitive indicators and on overall system performance. This impact assessment module supports the directives computation module 584 by quantifying the impact of possible interventions to the human-machine system, based on the current cognitive state of the user. For example, the impact assessment module 582 would return a negative impact value on a draft directive that would significantly disrupt the user risking a decrease in performance similar to a situation observed and recorded in the past. Another example of an impact assessment is a positive impact value for a draft directive that specified an intervention similar to a past intervention that yielded improvement in cognitive indicators and system performance.

The directives computation module 584 takes in the strategic cognitive assessment from the cognitive indicators and work pattern analysis module, and computes directives, based on knowledge of automation capabilities and rules of engagement, and on-going impact assessments generated by an impact assessment component that leverages archived performance data from the cognitive indicators and work pattern analysis module. For example, the directives computation module 584 receives a strategic cognitive assessment that characterizes the need to generate a directive because the user's attentional focus is too high and they are deviating very significantly from a high priority task. It would then search the repository of automation capabilities and rules to compute a series of draft directives (or interventions) that are possible in the current system. For example, these draft directives may include issuing an alarm in visual form, or offloading a task to the automation. These draft directives would be evaluated by the impact assessment module, which would return impact values for all draft directives. The directives computation module would then compare and contrast these impact values to select one or more directive(s) to implement. For example, the issuing of an alarm in visual form may disrupt too much the user while offloading a task to the automation is likely to yield better performance without impact on the user's cognitive indicators. The set of selected directive and relevant parameters of automation capabilities and rules are then output to the directives formatting module.

The directives formatting module 588 creates formatted automation directives 590 based on a pre-defined user interface library 592. For example, the directives formatting module 588 establishes how a visual is to be displayed on the user's interface, based on the selected directives and the parameters transmitted by the directives computation module 584: the directives formatting module 588 would decide on what icons to use, what size font to display, what visual elements to include and where they should be positioned in the interface.

The automation capabilities and rules 586 is a repository of capabilities from which directives can be crafted, and or rules relevant to said capabilities. For example, FIG. 5B illustrates a series of rules for the intrusiveness and magnitude of alerts based on the delta values (difference between actual and expected task performed by the user) and the priority of the task the user should be working on.

The user interface library 592 is a repository or database of interface components that may be used by the directives formatting module 588 to craft the automation directives 590 sent to the automated system. For example, the user interface library 592 could include a database of icons and fonts, a repository of useful documents to reference in an automation directive 590 and of standard alert messaging language to be employed in the system.

The automation directives 590 are the actual interventions produced by the directives formatting module 588 and pushed to the automated system. The automation directives 590 generally comprise those appropriate interventions that the processor based automated system should undertake to accommodate the cognitive state of the human. For example, an automation directive 588 may be a blinking alert message in the top right corner with a warning icon that tells the user to read a specific document which they have missed. An automation directive may also comprise instructions for the automated system to perform a task of the human-machine team such as instructing a gripping arm on a robot on a manufacturing plant floor grasping an item or the instructing of a computer to communicate pre-defined instructions across a distributed communications network rather than wait for the human to provide a communication.

The disclosed system can be applied to many different situations. For example, and not for limitation, the interaction based cognitive assessment input systems may be applied in training situations or in expertise assessment situations. In training, interaction based CAISs can leverage work patterns and work strategies—when learned with expert users—and contribute this knowledge to a structured tutoring program that guides novices through the steps and tasks that are expected to be completed for a given job (e.g., prompting new users about what to pay attention to, whom to message, etc.). Furthermore, as relates to expertise assessment, the same learned knowledge of work patterns and work strategies can serve as desired behavior benchmarks against which novices are graded (e.g., did they complete the correct steps, how quickly, etc.). Also, building on the expertise assessment idea, measures of cognitive state throughout training or assessments can also serve to indicate the level of expertise achieved by the user; for example, individuals who are less confident in the job may exhibit higher stress levels or cognitive overloading than those who are more familiar with the job (lower stress may suggest the achievement of a higher expertise level).

As will be readily apparent to those skilled in the art, some embodiment of the disclosed human-machine systems and methods can be embodied in hardware, software, or a combination of hardware and software. For example, a computer system or server system, or other computer implemented apparatus combining hardware and software adapted for carrying out the methods described herein, may be suitable as one of the system components. In some embodiments, a specific use computer, containing specialized hardware and/or specialized software for carrying out one or more of the instructions of the computer program, may be utilized.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 7:
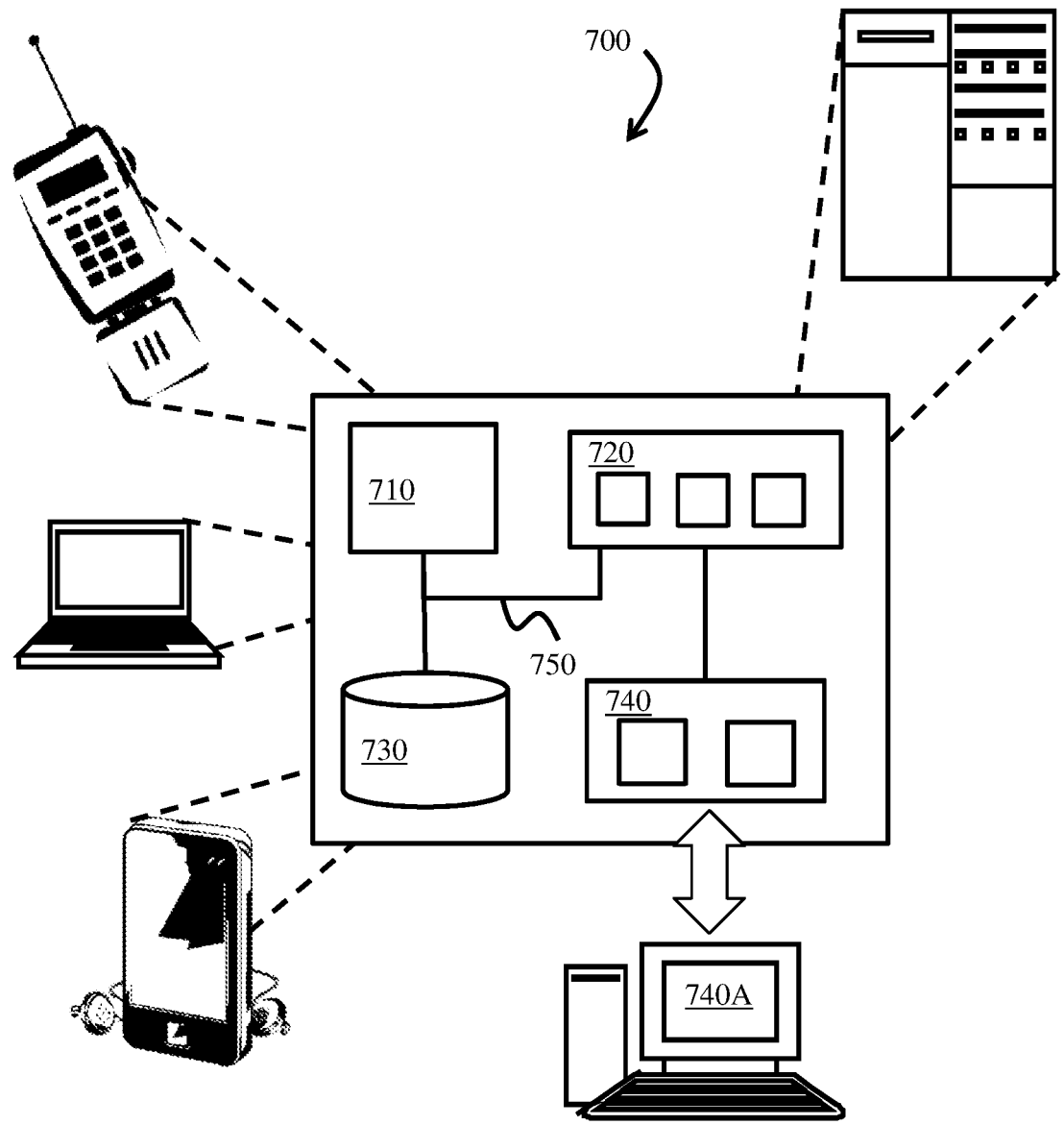
FIG. 7 illustrates one example embodiment of a computer system suitable for a cognitive assessment input system (CAIS)

FIG. 7 is a schematic diagram of one embodiment of a computer system 700 by which the methods may be carried out. The computer system 700 can be used for the operations described in association with any of the computer implemented methods described herein. The computer system 700 includes at least one processor 710, a memory 720 and an input/output device 740. Each of the components 710, 720, and 740 are operably coupled or interconnected using a system bus 750. The computer system 700 may further comprise a storage device 730 operably coupled or interconnected with the system bus 750.

The processor 710 is capable of receiving the instructions and/or data and processing the instructions of a computer program for execution within the computer system 700. In some embodiments, the processor 710 is a single-threaded processor. In some embodiments, the processor 710 is a multi-threaded processor. The processor 710 is capable of processing instructions of a computer stored in the memory 720 or on the storage device 730 to communicate information to the input/output device 740. Suitable processors for the execution of the computer program instruction include, by way of example, both general and special purpose microprocessors, and a sole processor or one of multiple processors of any kind of computer.

The memory 720 stores information within the computer system 700. Memory 720 may comprise a magnetic disk such as an internal hard disk or removable disk; a magneto-optical disk; an optical disk; or a semiconductor memory device such as PROM, EPROM, EEPROM or a flash memory device. In some embodiments, the memory 720 comprises a transitory or non-transitory computer readable medium. In some embodiments, the memory 720 is a volatile memory unit. In another embodiment, the memory 720 is a non-volatile memory unit.

The processor 710 and the memory 720 can be supplemented by, or incorporated in, ASICs (application-specific integrated circuits).

The storage device 730 may be capable of providing mass storage for the system 700. In various embodiments, the storage device 730 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 730 comprises a transitory or non-transitory computer readable medium.

In some embodiments, the memory 720 and/or the storage device 730 may be located on a remote system such as a server system, coupled to the processor 710 via a network interface, such as an Ethernet interface.

The input/output device 740 provides input/output operations for the system 700 and may be in communication with a user interface 740A as shown. In one embodiment, the input/output device 740 includes a keyboard and/or pointing device. In some embodiments, the input/output device 740 includes a display unit for displaying graphical user interfaces or the input/output device 740 may comprise a touchscreen. In some embodiments, the user interface 740A comprises devices such as, but not limited to a keyboard, pointing device, display device or a touchscreen that provides a user with the ability to communicate with the input/output device 740.

The computer system 700 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

Figure 6:
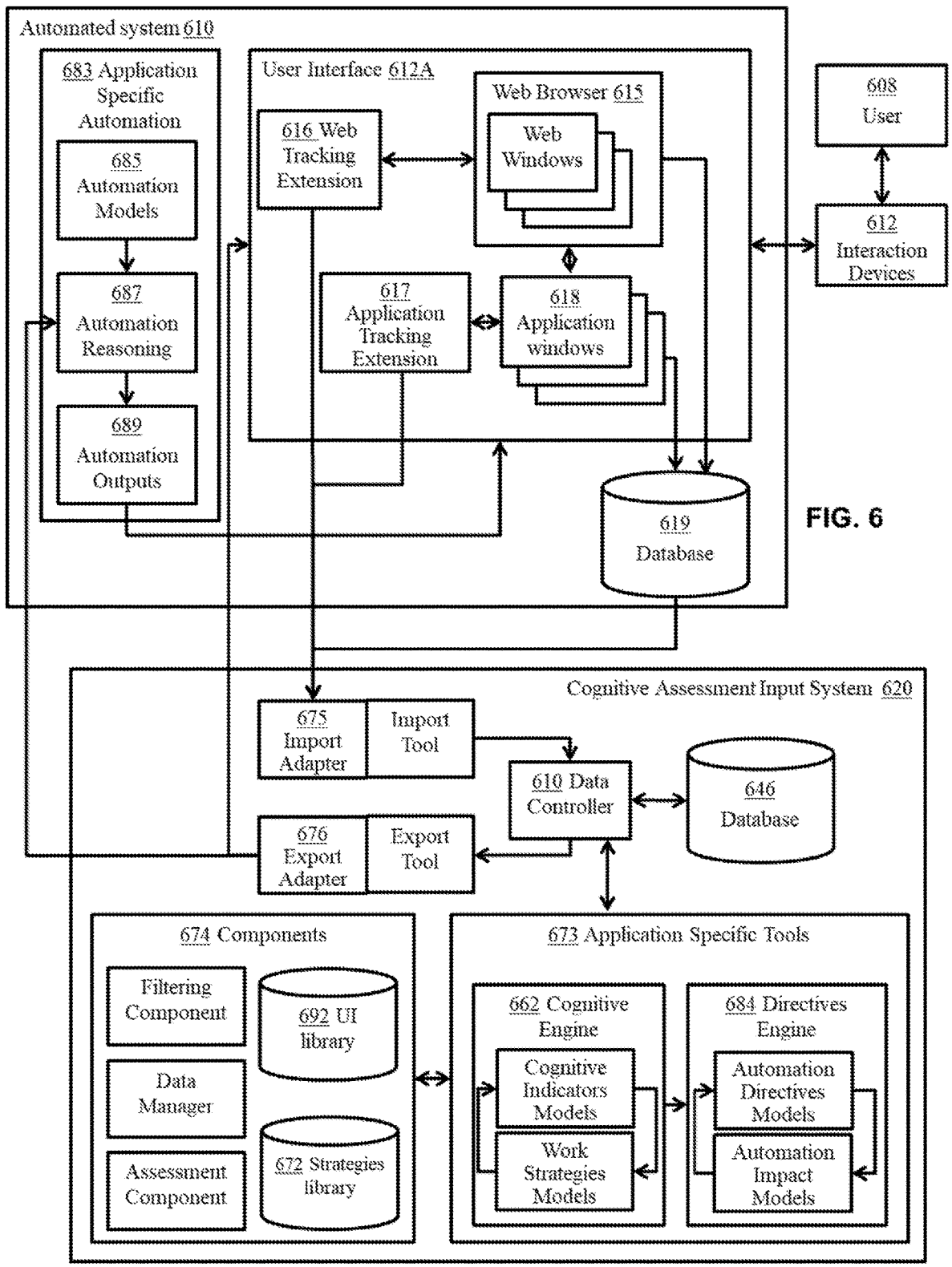
FIG. 6 shows an architectural diagram of one embodiment of a cognitive assessment input system (CAIS)

A functional diagram of one embodiment of a processor based human-machine system capable of executing the described methods is shown in the functional diagram in FIG. 6. As shown, the system generally comprises an automated system 610 and a CAIS 620. The automated system 610 generally interacts with the user 608 through interaction devices 612 and provides functions to include executing directives from the system. The CAIS 620 is in communication with the automated system 610 to monitoring interact and other data to make the assessments and determine the appropriate directives.

The CAIS 620 generally provides application specific tools 672 that provide the cognitive assessments and the directives for automated system 610. The cognitive engine 662 provides the cognitive assessment from the cognitive indicators using cognitive indicators models and may also use work strategies models. The directives engine 684 provides the directives computation using automation directives models and automation impact models. The application specific tools 673 may utilize components 674 such as a user interface library 692 and a 672 strategies library to provide information for the assessments and/or directives. The CAIS 620 may also include a data controller 610, a system database 646 and interfaces such at the import adapter 675 and the export adapter 676 to communicate with the automated system 610.

The automated system 610 is the machine in the human-machine team and generally comprises a user interface 612A and application specific automation 683. The user interface 612A allows the user 608 to interact with the automated system 610 through one or more interaction devices 612. For example, as shown, the user interface 612A may be a web browser 615 that allows the user 608 to interact with application 618. While the user 608 interacts with the application 618, web tracking extensions 616 and/or application tracking extensions 617 monitor activity to be communicated to the CAIS 620. Appropriate information from the automated system 610 may be stored in a database 619. Also shown are application specific automation 683 which represents specific automation that may be applied based on the application of the automated system 610. For example, the directives applied to a robotic system on a manufacturing floor would be very different than the automation provided to a security monitoring system. To provide application specific automation 683 functions, application specific automation models 685, automation reasoning 687 and automation outputs 689 (directives) will be utilized.

Another example embodiment of the CAIS and methods of its use may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Figure 8:
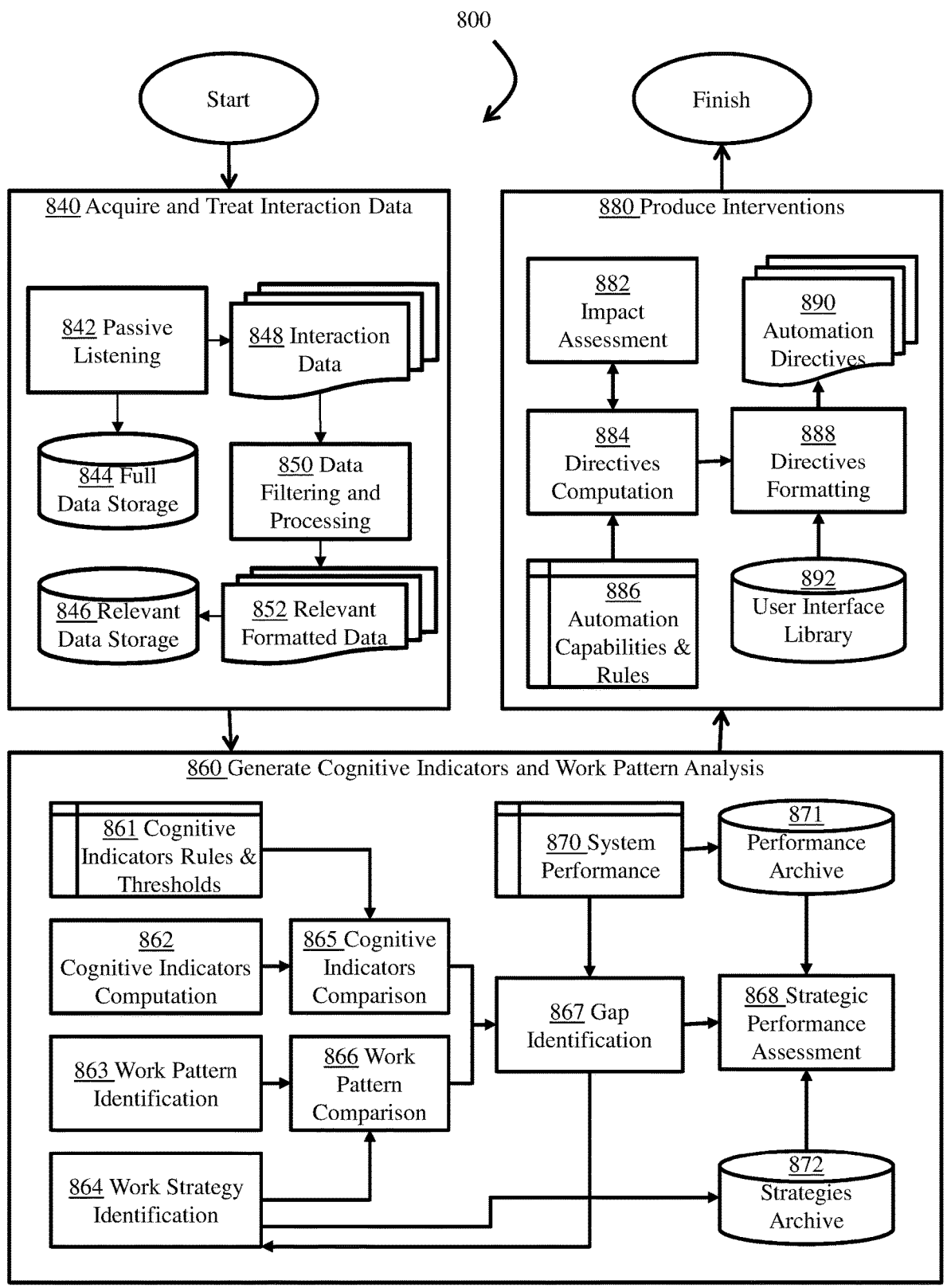
FIG. 8 illustrates one example embodiment of a process flow diagram of methods of using a cognitive assessment input system.

One Embodiment of Methods to Use Human-Machine Systems with Interaction Based CAIS:

As shown in FIG. 8, the methods for using human-machine systems with interaction based CAIS generally comprises a combined order of specific rules generally involving acquiring interaction data, followed by its treatment (filtering for relevance and formatting for exploitation) at 840, generating cognitive indicators and work pattern analyses at 860 and producing interventions directly useful to automated system(s) at 880.

At 840, the step of acquiring and treating interaction data generally functions to receive interaction data from the human-machine systems and output relevant and formatted data for the analysis of cognitive indicators and work pattern. To perform these functions, this step includes the activities generally utilizing the components of the CAIS (consistent with the modules shown in FIG. 3). At 842, the passive listening module unobtrusively captures interaction data 848 between one or multiple human or automated team member(s) and one or multiple automated system(s). At 844, the full data storage module archives all data captured by the passive listening module for future retrieval. At 850, the data filtering and processing module exploits the interaction data 848 captured by the passive listening module in real time, which includes, but is not limited to, time-tagging, meta-tagging, data cleaning, data slicing and binning, and outputs a stream of relevant and formatted data at 852. At 846, the relevant data storage module archives all data output by the data filtering and module to have a permanent archive. At 860, the step of generating cognitive indicators and work pattern analysis generally comprises the function of receiving relevant and formatted data from the interaction data acquisition module and outputting the strategic cognitive assessment for the intervention building module and performance data for the intervention building module. To perform these functions, this step includes activities generally utilizing the components of the CAIS (consistent with the modules shown in FIG. 4). At 862, the cognitive indicators computation module computes cognitive indicators (such as workload, fatigue, stress, attention, etc.) based on relevant, formatted interaction data, from established models and formulae. At 863, the work pattern identification module identifies a work pattern (short-term, actions-based behavior) based on relevant, formatted interaction data, from application specific models and formulae. At 864, the work strategy identification module identifies a work strategy (long-term, goals-based behavior) based on relevant, formatted interaction data, from application specific models and formulae. At 872, the identified work strategy may be archived for future exploitation. At 865, the cognitive indicators comparison module compares the computed cognitive indicators to rules and thresholds defined for the human-machine teams. At 866, the work pattern comparison module compares the identified work pattern against the identified work strategy. At 867, the gap identification module identifies gaps in cognitive indicators and work patterns from the outputs of the two comparison modules and current system performance data. At 867, the gap identification module also feeds gap identification information back into the work strategies identification module to continuously improve that module's performance with updated information. At 868, the strategic performance assessment module produces and communicates a strategic performance assessment based on gap identification data, archived performance data, and archived strategies data. At 880, the step of producing interventions with the intervention building module generally comprises receiving (1) strategic cognitive assessment from the cognitive indicators and work pattern analysis module and (2) performance data from the cognitive indicators and work pattern analysis module to produce automation directives that feed back into the automated system (s). As described above, the strategic cognitive assessment is generally provided by the cognitive indicators computations module and the performance data is generally provided by the strategic performance assessments module. This step includes the following activities generally utilizing the components of the CAIS (consistent with the modules shown in FIG. 5A). At 884, the directives computation module takes in the strategic cognitive assessment from the cognitive indicators and work pattern analysis module, and computes directives, based on (i) knowledge of automation capabilities and rules of engagement, and (ii) on-going impact assessments generated by an impact assessment module that leverages archived performance data from the cognitive indicators and work pattern analysis module. At 888, the directives formatting module creates and communicates formatted automation directives based on a pre-defined user interface library.

The result of these methods is that a likely to be positively impactful automation directive 890 is sent to the machine to implement the specific intervention for the user-machine team. As a result, the machine will display through the user interface a specifically formatted message or other intervention to enhance the user's performance. Alternatively, an automation directive may lead to an intervention that is not directed to the human counterpart of the team; as such, it may direct the automated system to perform a task for the human-machine team to reduce the user's cognitive overload.

One Example Embodiment of the Human-Machine System with a Cognitive Assessment Input System in Operation (InfoCog):

In the InfoCog example embodiment of a human-machine system with the CAIS, the system is used to monitor human-machine teams monitoring naval vessels. In InfoCog, the Communications Station Watch Officers, as users and humans in the human-machine team, are tasked with monitoring and maintaining functioning communication status between all ships and port sites involved in missions across a large geography. Currently, Watch Officers wade through seas of messaging data, complex network connectivity maps, and regional weather updates to identify important concerns and critical requests from among the "noise." Then, they have to balance and prioritize responsive actions according to both the commander's stated intents as well as the perceived urgency of the situation. Being able to make correct decisions involves maintaining awareness of current situations across many different locations and ongoing missions, all while keeping in mind an updated list of the high value entities emphasized by the commander (i.e., high workload). Adding to the difficulty of this role, Watch Officer shifts last between 8-12 hours (i.e., fatigue may impact performance/outcomes). InfoCog is a system of systems that monitors both task-dependent data streams and user-workstation interactions to identify (a) the user's current position within a mission plan (i.e., indicating the current task and predicting the future task—work patterns), (b) relevant data associated with upcoming tasks, and (c) the user's current cognitive state. Based on the user's current cognitive state, the urgency of the observed relevant information, and the current position within the mission, InfoCog evaluates the intervention need and, when determined to be timely, formats the information for best impact and sends it to the front-end interface to provide task-relevant proactive decision support. In other words, the purpose is to identify, in real-time, human behavior (cognitive indicators and work patterns) that can regulate the formatting and delivery of task-relevant decision support information to reduce workload, minimize errors, mitigate the effects of fatigue, and lead to enhanced outcomes overall.

In the InfoCog example implementation, the interaction data acquisition module comprises a web-browsing application that logs the webpages' URLs, user clicks, and keyboard inputs (data entries), as well as meta-data (time of interaction). The application stores all data and produces a data feed formatted to be used for reasoning and analysis.

The InfoCog example implementation of the cognitive indicators and work pattern analysis modules comprises the cognitive indicator computation module that is configured to calculate cognitive indicators of both workload and fatigue based on signals monitored from the user's interface with the workstation (i.e., human-computer interactions such as log in/out time, mouse clicks, programs opened, keyboard inputs). These signals may be received and archived in a file format such as XML, then selected as relevant through a filtering script that parses the data for the requisite timeframe and for the target applications of focus. The relevant data is then meta-tagged and archived in a database, and transformed to indicators by a formula-based application script which computes real-time values for cognitive indicators. These values are stored in the database, too.

In the InfoCog example embodiment, workload is calculated as a combination of mouse click rate, switch rate, and dwell time across a sliding window of a specified length of time. The time period (or increment size) can be set by the system administrator or determined through validation testing. For example, as Watch Officers are using the various standard applications of their workstations, InfoCog identifies the relevant formatted data input (click rate over the last minute, application switch rate over the last minute, and dwell time for each application) and produces an algebraic computation over these values. The output is stored as the workload indicator for the past minute. This operation is repeated every second over a sliding time window, in order to compute a workload curve with a sample rate of one data point per second.

The InfoCog work pattern identification module has been implemented for a sample user with a pre-defined set of tasks within a "mission." The underlying task recognition model was trained with labeled data; model testing revealed that task recognition was 85% accurate (i.e., it identified the correct task from 13 possible tasks 85% of the time). The model was trained on features generated from user-workstation interactions (e.g., document/site name, program type, interaction type, text typed or moused-over) and the list of tasks in the mission with Latent Dirichlet Allocation (LDA) Natural Language Processing (NLP) methods and K-Nearest Neighbor classifiers. The methods used for creating the InfoCog work pattern indicator module can be replicated for any user or set of tasks as long as labeled training data and a list of tasks is provided.

Some embodiments may utilize an additional work pattern identification module that predicts the current task based on the flow of data to the system.

Some embodiments with multiple work pattern identification modules may include an optional gap identification module. An example embodiment of the gap identification module is implemented in the InfoCog embodiment. For example, that embodiment takes in the series of relevant, formatted interaction data and applies a pattern recognition and matching algorithm against the pre-labeled training data, in order to produce stochastic estimates of the task and mission currently being performed by the human user. For example, the above described InfoCog work pattern activity outputs the following items: agreement—boolean, if agreement then true, if not in agreement false (optional if more than one type of work pattern identification module is used); CALtask—current task predicted by CAL (predicted by the work pattern identification module); MALtask—current task predicted by MAL (optionally, predicted by a second work pattern identification module); delta—+ if MAL more probable, —if CAL more probable (optional if more than one type of work pattern identification module is used); (Tasksubi,TaskProbsubi)—a list of all possible tasks detected and their probability; currentTask—the name of the most likely current task; currentTaskProb—the probability of the most likely current task; nextTask—the name of the recommended next task based on knowledge of work patterns and on the most likely current task; and nextTaskProb—the probability of the recommended next task.

The intervention building module from InfoCog implements a two-module architecture with a directives computation module and a directives formatting module. The directives computation module of InfoCog is meant to transform the output of the gap identification and cognitive indicators and work patterns analysis module into an actionable message which the directives formatting module can interpret and format as an intervention, before pushing it out to the end-system.

The directives computation module computes a measure of intrusiveness and a measure of magnitude for the actionable message, based on the difference between currentTaskProb and nextTaskProb (or delta value) and the priority of the task the user should be working on next (nextTask). A rules matrix has been setup to create the mapping shown in FIG. 5B. The "delta value" refers to the probability difference between two estimates of the top task being likely to be performed by the user.

The rationale behind the matrix is that (1) intrusiveness is correlated with the impact of non-response to the actionable message, which is based on the priority of the task users should be working on (that is, the more urgent a task is, the more intrusive the message should be); and (2) magnitude is correlated with the urgency of user response in terms of task focus (that is, if the user is working on what they should be working on, the magnitude is low, because there is no urgency in their changing task focus; conversely, the magnitude augments as the user is performing tasks that are increasingly remote from the task they should be working on). Some embodiments may incorporate matrices and data consistent with that disclosed in U.S. Pat. No. 9,293,054 issued on Mar. 22, 2016, which is herein incorporated by reference in its entirety.

The actionable message that is communicated between the directives computation module and the directives formatting module is a triplet that includes intrusiveness (low, medium, high), magnitude (low, medium, high), and nextTask (value provided by the gap identification). The actionable message may also be enhanced to include details of the cognitive indicators. These cognitive indicator details, as values for cognitive indicators (e.g., workload, fatigue, attention etc.), may be used to (1) provide granularity in the gap identification module, or (2) modulate the intrusiveness and magnitude in the directives computation module, or (3) to influence the formatting of the interventions in the directives formatting module, or (4) to influence actions resulting from the directives computation module.

The directives formatting module is an online interpretation service that transforms the directives computation module's actionable message into visual interventions in the graphical user interface display employed by the user. This module leverages a user interface component library, which is made up of standard messages and icons, at various levels of formatting (varying sizes, fonts, colors, boldness, etc.). This module assembles an intervention in the form of a visual alert by selecting, from the library, those user interface components that satisfy the actionable message (level of intrusiveness, level of magnitude, and target task). That intervention may be conveyed to the system using XML.

Another Example Embodiment of the Human-Machine System with a Cognitive Assessment Input System in Operation (RSPACE):

In the RSPACE example embodiment, there is a need for the Air Force to adapt its mission planning processes to face novel threats and shifts in operational capabilities. In particular, the Air Force wants to distribute mission planning, monitoring, and re-planning, beyond Air Operations Centers (AOCs), into many forward operating nodes (e.g., bases), to ensure dynamic agility to constantly evolving environment constraints. RSPACE functions as a system of systems where multiple human operators collaborate with multiple automated planners (machines) to setup Air Task Orders (ATOs) that create plans for human or automated assets to employ resources for achieving tasks.

In the RSPACE solution, the various automated systems are configured to capture human-machine interactions at the planning level. The purpose is to identify, in real-time, human behavior (cognitive indicators and work patterns) that can in turn inform automated planners (closing the loop online) and system designers (closing the loop offline). In the former case, the purpose is to have automated planners take into account operator state (such as fatigue, workload, attention, etc.) in order to provide better support (e.g., alerts, support messages, queuing of information etc.) or to optimize plans (e.g., increased automation in certain areas of planning, computing sample courses of actions etc.). In the latter case, the purpose is to provide usability insights to the designers of the automated planners, in order to improve feature discoverability, access, understanding, and exploitation.

The RSPACE example implementation of the interaction data acquisition module comprises a java logger deployed as a web-browser extension plus embedded commands in the source code of specific applications. These loggers collect all human interactions with the system (clicks, zoom, data entries, etc.) as well as meta-data (application, target and time of interactions). These loggers store, clean and make data accessible for reasoning and analysis.

The RSPACE example implementation of the cognitive indicators and work pattern analysis modules comprises the cognitive indicator computation module configured to calculate cognitive indicator values using several measure definitions for cognitive indicators and work patterns. One example of calculating cognitive indicators is an estimation of workload by using click rate as a measure. From the log of interactions that feeds it, the cognitive indicators computation module computes the rate at which the user clicks on items in the interface. Past research has showed a correlation between click rate and workload for supervisory control tasking. The calculated click rate can then support the computation of workload, which may be assessed as low, medium, high, based on knowledge of the missions performed by the users. An example of determining a work pattern is the computation of work pattern using system feature usage as a measure. From the log of interaction data, feature coverage metrics can be used as an indicator of which features of the automated systems are actually used by the operator. This is akin to a work pattern identification because it verifies whether operators are performing the work using the correct elements in the system. Over time, a library of strategies for usage of these elements for each type of cognitive indicator and work pattern can be built. The outputs of the cognitive indicators and work pattern analysis module (cognitive indicator values and work patterns) constitute the strategic performance assessment for RSPACE. In some embodiments, the strategic performance assessment may be enhanced with performance assessments derived from a performance measurement systems such as those disclosed in U.S. patent application Ser. No. 15/098,216 filed Apr. 13, 2016 (e.g., Aptima's PM Engine solution) which is herein incorporated by reference in its entirety. The performance measurement systems may compare the specific values to a standard or to a historical metric to further enhance the assessment.

The intervention building module for RSPACE uses the strategic performance assessment computed by the cognitive indicators and work patterns analysis module to display usability insights through visual widgets. The goal is to provide feedback to the users of the RSPACE technology on how humans are using their systems. The "intervention" in this case is the translation of the assessments into insights to more efficiently operate the system. In some embodiments, the output of the cognitive indicators and work pattern analysis module can be used by the intervention building module to automatically drive automation adaptation that will automatically improve the efficiency of the human-machine system. Examples of automation adaptation include: dynamic, context-based alerts; automation level changes; planning model constraints changes; data or document queuing to anticipate user and mission needs.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A processor based automated system, the processor based automated system comprising:
   an input device;
   a cognitive assessment input system (CAIS) in communication with the input device and comprising:
      an interaction data acquisition module configured to receive input data from the input device as interaction data,
      a cognitive indicators and work pattern analysis module configured to determine a strategic performance assessment from the interaction data, and
      an intervention building module configured to determine automation directives for the processor based automated system from the strategic performance assessment;
   the processor based automated system specifically configured for use in a human-machine team;
   the processor based automated system configured determine an automation directive from the CAIS based on the strategic performance assessment;
   the processor based automated system configured to receive and execute automation directives from the CAIS as an input source to the processor based automated system; and
   wherein the input device comprises a mouse and the interaction data comprises one of the interaction data selected from the group consisting of:
      a click rate,
      a switch rate, and
      a dwell time.

2. A processor based automated system, the processor based automated system comprising:
   an input device;
   a cognitive assessment input system (CAIS) in communication with the input device and comprising:
      an interaction data acquisition module configured to receive input data from the input device as interaction data,
      a cognitive indicators and work patterns analysis module configured to determine a cognitive measure of a cognitive state of a human from the interaction data, and
      an intervention building module configured to determine automation directives for the processor based automated system from the cognitive measure;
   the processor based automated system specifically configured for use in a human-machine team;
   the processor based automated system configured determine an automation directive from the CAIS based on the cognitive measure;
   the automated system configured to receive and execute automation directives from the CAIS as an input source to the processor based automated system; and
   wherein the input device comprises a mouse and the interaction data comprises one of the interaction data selected from the group consisting of:
      a click rate,
      a switch rate, and
      a dwell time.

3. A processor based input system for automatically determining the cognitive state of a human as an input source to a processor based automated system configured, the processor based input system comprising:

an input device;
a cognitive assessment input system (CAIS) in communication with the input device and comprising:
    an interaction data acquisition module configured to receive input data from the input device as interaction data, and
    a cognitive indicators and work patterns analysis module configured to determine
    a cognitive measure of a cognitive state of the human from the interaction data;
the processor based automated system configured for use in a human-machine team;
the processor based automated system configured determine an automation directive from the CAIS based on the cognitive measure;
the processor based automated system configured to receive and execute the automation directive from the CAIS as an input source to the processor based automated system; and
wherein the input device comprises a mouse and the interaction data comprises one of the interaction data selected from the group consisting of:
    a click rate,
    a switch rate, and
    a dwell time.

4. The processor based input system of claim 3 wherein the cognitive indicators and work patterns analysis module uniquely models the input data and the cognitive state of a specific individual.

5. The processor based input system of claim 3 wherein the cognitive measure is determined and the automation directive is received in near real-time.

6. The processor based input system of claim 3 further comprising an intervention building module configured to determine the automation directive for the processor based automated system based on the cognitive measure.

7. The processor based input system of claim 6 wherein if the cognitive measure exceeds a pre-defined threshold, the automation directive from the CAIS is an instruction for the processor based automated system to perform a task.

8. The processor based input system of claim 7 wherein the instruction for the processor based automated system to perform the task comprises an instruction to communicate a pre-defined instruction across a distributed communications network.

9. The processor based input system of claim 6 further comprising:
    a strategic performance assessment module configured to determine a performance measure; and
    the intervention building module configured to determine the automation directive based on the cognitive measure and the performance measure.

10. The processor based input system of claim 9 wherein if the performance measure fails to meet a pre-defined threshold, the automation directive from the CAIS is an instruction for the processor based automated system to perform a task.

11. The processor based input system of claim 10 wherein:
    the human-machine team performs a plurality of human-machine tasks to be performed by either the human in the human-machine team or the processor based automated system as the machine in the human-machine team;
    the plurality of human-machine tasks further comprise a plurality of manual human-machine tasks to be preferably performed by the human; and
    the instruction for the processor based automated system to perform the task comprises instructing the processor based automated system to change one of the plurality of manual human-machine tasks to be performed by the processor based automated system.

12. The processor based input system of claim 11 wherein the one of the plurality of manual human-machine tasks comprises one selected from the consisting of:
    a task planning task;
    a task monitoring task;
    a surveillance task;
    a search task;
    a rescue task;
    a network monitoring task; and
    a facility monitoring task.

13. The processor based input system of claim 11 wherein:
    use in the human-machine team comprises receiving the input data representing an input from a pilot and the processor based automated system comprises an autopilot system of an aircraft; and
    the one of the plurality of manual human-machine tasks comprises one selected from the group consisting of:
        a navigation task;
        and
        a flight task.

14. The processor based input system of claim 3 wherein the input device comprises a sensor selected from the group comprising:
    a computer mouse,
    a computer
    a keyboard,
    an eye tracking camera,
    an operating system use activity;
    a stylus;
    a touchscreen;
    a touchpads; and
    a pressure-sensitive mechanism.

15. The processor based input system of claim 3 wherein the interaction data comprises an operating system use activity comprising one of the operating system use activity consisting of:
    a program accessed;
    a website accessed; and
    a document accessed.

16. The processor based input system of claim 3 wherein the interaction data comprises an operating system use activity comprising one of the operating system use activity consisting of:
    a program used;
    a website used; and
    a document used.

* * * * *